3,286,097
PHOTOMETRIC DEVICE HAVING OPTIONALLY SELECTIVE RESPONSE TO LIGHT ON TWO PHOTORESISTIVE CELLS
Donald W. Norwood, 1470 San Pasqual, Pasadena, Calif.
Filed Nov. 7, 1963, Ser. No. 322,098
12 Claims. (Cl. 250—209)

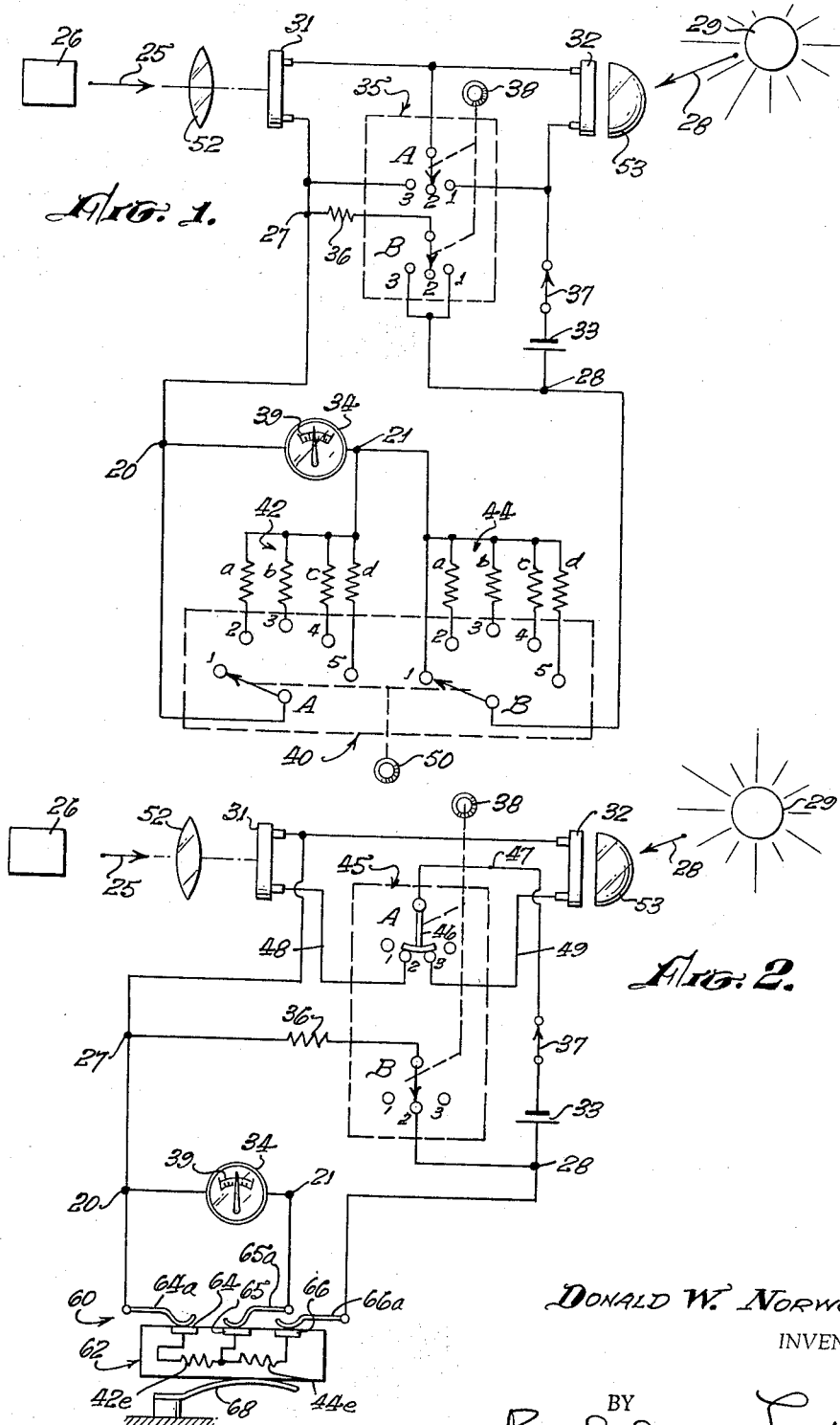

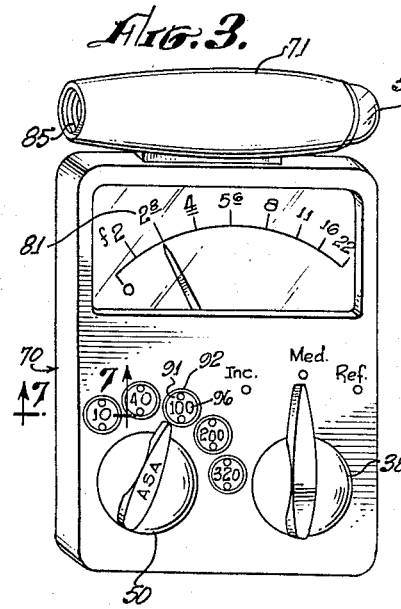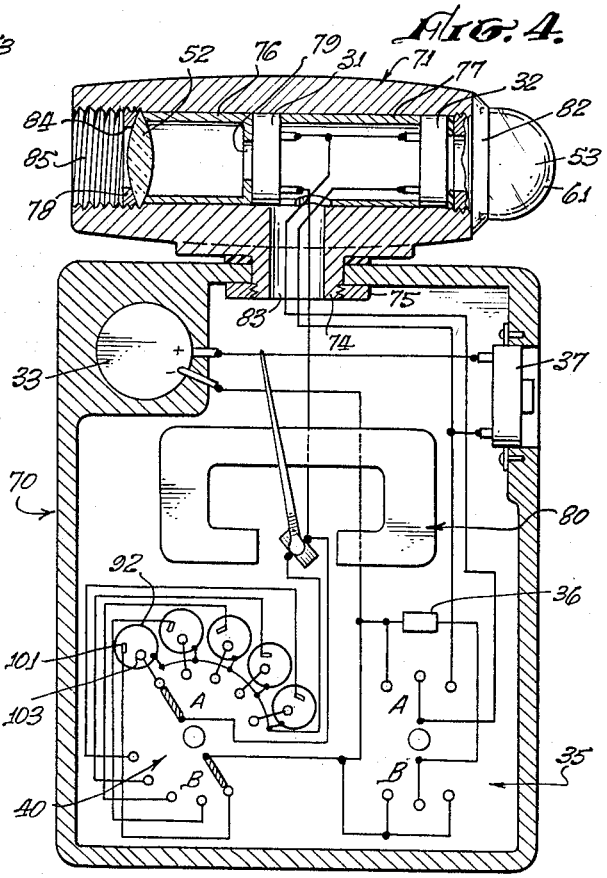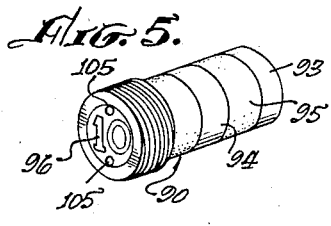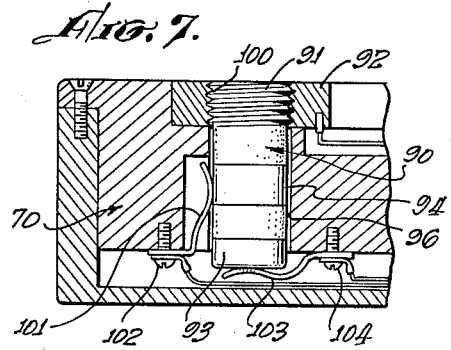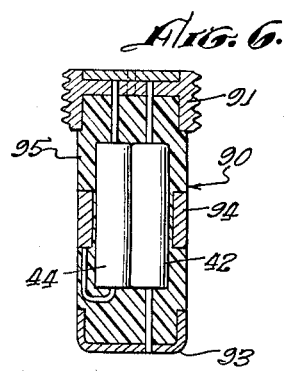
DONALD W. NORWOOD,
INVENTOR.
BY Barbeler + Lewis United States Patent Office 3,286,097
Patented Nov. 15, 1966

This invention relates to a light responsive device which has two photoelectric cells of the photoresistive type. The device is so designed as to provide optionally selective response to illumination on one cell, or the other cell, or both cells at once. Unique means are provided so that in the latter case the said response is a significant medial value between the responses which would be obtained from each of the two cells taken individually, and is of the same order as the response from either cell alone.

In a preferred form of the invention compatible means are provided so that the sensitivity of the device can be adjusted to suit various conditions. Unique means are employed to provide unusual convenience in the changing of sensitivity, and to provide unusual range of steps of sensitivity.

This invention is particularly useful in the case of photoelectric exposure indicating or control means for photographic devices. As employed in the present specification and claims the terms "photography" and "photographic" include such processes as the recording of light images, as on sensitive emulsions, and also the reproduction of such images at a distance, as by television and the like. For such use it has been found desirable to provide apparatus suitable for selective response to light reflected from a photographic scene, or to light incident on the scene, or to both at once. Reference is made to a discussion of this matter in my U.S. Patent No. 3,091,166. Such photoelectric exposure control means also preferably includes means for adjusting sensitivity to match the type of film used in the camera, or to match selected camera shutter time, or both.

My prior patent, just referred to, No. 3,091,166, discloses a photometric system utilizing two photoelectric cells, shown illustratively as of photovoltaic type, and providing adjustment of sensitivity by means of movable light valves in the path of light incident upon the photoelectric cells. Whereas such a system is satisfactory in many respects, it is difficult to provide adequate light sensitivity, especially for full utilization of the very sensitive photographic films that have recently become available. Also, it is advantageous to provide means for varying the sensitivity of the system by electrical rather than by optical means.

The present invention provides those benefits, while retaining the outstanding advantages of the previous system. That has been accomplished through utilizing photoresistive cells, and by development of particularly effective circuitry for accomplishing the various selective options as to type of response with cells of that type. The invention further provides for variation of sensitivity by electrical means without interfering with that optional selectivity of function.

A further aspect of the invention provides particularly convenient and reliable variation of sensitivity through unique provision for interchangeable units that control the sensitivity in a circuit of the present type. In a preferred form of the invention, a plurality of such units are combined with a selection switch in a novel manner that provides great flexibility in the sensitivity values that are made available, while positively preventing confusion or error in their use.

A full understanding of the invention, and of its further objects and advantages, will be had from the following description of certain illustrative manners of carrying it out. That description, and the accompanying drawings which form a part of it, are intended only as illustration, and not as a limitation upon the scope of the invention, which is defined in the appended claims.

In the drawings:

FIG. 1 is a schematic diagram representing an illustrative electrical circuit in accordance with the invention;

FIG. 2 is a schematic diagram representing a modified electrical circuit;

FIG. 3 is a perspective representing an illustrative exposure meter in accordance with the invention, utilizing a circuit generally corresponding to FIG. 1;

FIG. 4 is a somewhat schematic section corresponding to FIG. 3;

FIG. 5 is a perspective representing at enlarged scale an illustrative interchangeable cartridge for sensitivity control in accordance with the invention;

FIG. 6 is an axial section corresponding to FIG. 5 at further enlarged scale; and FIG. 7 is a fragmentary section at enlarged scale taken essentially on the line 7—7 of FIG. 3.

The electrical circuit shown in FIG. 1 includes a first photoresistive cell 31, with an associated light collector 52, shown schematically as a lens, adapted for illuminating the cell with light reflected from a photographic scene; and a second photoresistive cell 32, with an associated light collector 53, shown schematically as a hemispherical translucent surface, adapted for illuminating that cell with light incident on the photographic scene. Photocell 31 and light collector 52 are arranged to receive light arriving along a selected direction, indicated schematically by the arrow 25, as from a photographic scene at the left of the drawing. Such a photographic scene is represented schematically at 26. Photocell 32 and light collector 53 are arranged to receive light arriving in a generally opposite direction, indicated schematically by the arrow 28, as from a source of light at the upper right. Such a light source is represented schematically at 29 and typically also illuminates scene 26. It is usually convenient to mount the photocells back to back, facing in opposite directions, as illustrated. However, other arrangements may be employed, with suitable optical reflective means for directing light upon them from the desired directions. The photoresistive cells 31 and 32 may be of any desired construction. Conventional cadmium sulfide or cadmium selenide cells are illustrative, and typically provide a resistance between the two terminals of each cell that varies several orders of magnitude in response to varying illumination between darkness and sunlight. For example, the resistance of each cell may be of the order of 500,000 ohms at low light levels such as at twilight, and decrease to some definite value such as 5,000 ohms when the collector is oriented in the described manner with respect to a photographic scene of particular character illuminated by direct sunlight, those values being merely illustrative.

A source of electrical power is represented schematically as the battery 33, connected in series with the main control switch 37. An electrically responsive output device is indicated at 34. That device is shown for definiteness as a visual meter with the usual pointer and scale 39, but may alternatively comprise mechanism of known type for directly driving a lens iris or the like of a camera to vary a photographic exposure. Output device 34, whether a simple visual meter or a relatively complex control system, inserts into the circuit between the terminals 20 and 21 a characteristic resistance of definite value, which will be referred to for convenience as $R_m$. The numeral 36 represents an impedance of any suitable type, typically a resistance element having a value equal to the resistance $R_m$ of output device 34. All of the described elements are connected together by circuit means that include the connecting wires shown illustratively in FIG. 1 and the two multiple position switches 35 and 40. They may be controlled in any suitable manner, as by the respective manual knobs 38 and 50. Each of those switches typically comprises two mechanically coupled but electrically independent sections A and B. Switch 40 controls the resistance sets 42 and 44, to be described below. When in position 1, as illustrated, switch 40 functions merely to complete a direct connection between circuit points 21 and 28.

With switch 35 in position 2, as shown in FIG. 1, a main circuit is formed which includes in series battery 33, power switch 37 and output device 34. That circuit also includes the two photoresistive cells 31 and 32 connected in series. The magnitude of the current flowing in that circuit, and hence the response of output device 34, is determined by the constant voltage of battery 33, the constant internal resistance of output device 34, and the variable internal resistances of both series-connected cells 31 and 32. The cell resistances are determined by the intensity of light falling on each cell. Consequently, the response of output device 34 represents a medial value between the light intensities falling on the respective cells. As more fully explained in my prior patent, identified above, such a medial value provides a particularly useful measure of photographic exposure under certain conditions of illumination and for certain types of photographic scene.

When switch 35 is shifted to position 1, switch section A short-circuits photoresistive cell 32 out of action, and cell 31 is connected in series with battery 33 and output device 34. Switch section 35B simultaneously connects resistor 36 between circuit points 27 and 28 and hence in shunt to output device 34. The net result of those changes is that the resistance in the photocell portion of the circuit is reduced to a value determined by the one photoresistive cell 31, rather than the sum of the two cells 31 and 32; and the resistance in the output portion of the circuit is reduced by a factor of ½. Consequently, increased current flows from the battery. However, the parallel circuits between points 27 and 28 act as a current divider, so that only half of the total current flow between 27 and 28 passes through output device 34. As an end result, the output device responds to that current in a manner that correctly represents the value of the illumination on cell 31 only.

When switch 35 is shifted to position 3, a similar result takes place, except that in this case cell 31 is short-circuited out of action and current flows only through cell 32. Resistor 36 is inserted in shunt to the output device, as in switch position 1. Output device 34 responds to the current in a manner that correctly represents the intensity of illumination of photoresistive cell 32. Thus the circuit of FIG. 1 provides the selective options, under control of switch 35, of responding in consistent manner to the light intensity upon photoresistive cell 31, or to the light intensity upon cell 32, or to a definite medial value between the light intensities incident upon the respective cells. Stated more precisely, the relationship between the system responses for those options is as follows: whenever the light intensities incident upon photoresistive cells 31 and 32 are such as to make their respective resistance values equal, the system response is the same for all three positions of switch 35. If the light intensities produce different resistances in the two cells, the system responses in switch positions 1 and 3 correspond directly to those respective resistances; and the response in switch position 2 represents a medial value characteristic of the series connection of the two cells.

The system of FIG. 1 further permits especially convenient and effective variation of the over-all sensitivity of response by electrical means. In the illustrative form illustrated, the switch 40 is shiftable to a plurality of definite positions, each of which produces a definite change of sensitivity of the system. That is accomplished without disturbing the accurate relationship between the three alternative conditions selectable by switch 35. When switch 40 is in position 1, as shown, switch section 40A is open, and switch section 40B provides a direct connection between circuit points 21 and 28. In each of the other positions of switch 40, section A connects a selected one of the resistors 42 between the circuit points 20 and 21, and hence in shunt to output device 34. The current flowing between those circuit points is thereby divided between two parallel branches, one through output device 34 and the other through the inserted resistor. As a result, the effective sensitivity of the system is reduced in a definite ratio, depending upon the ratio of the resistances in those two branches. Any desired degree of reduction of sensitivity of the device may be attained by appropriate selection of the inserted parallel resistor, with relationship to the value of the constant internal resistance of output device 34.

At the same time, switch section 40B connects a corresponding one of the resistors 44 between the circuit points 21 and 28. Insertion of that series resistor has the effect of increasing the resistance of the main circuit. In accordance with the present invention, each series resistor 44 is so selected that its insertion just compensates the reduction of resistance between the points 20 and 21 produced by insertion of the corresponding parallel resistance 42. In that way the total resistance between circuit points 20 and 28 is maintained at a fixed value, regardless of the position of switch 40. That condition produces the advantage that the relationship already described between output device 34 and shunt resistor 36 is strictly maintained. Hence, regardless of the position of sensitivity-control 40, the mutual relationship between the functions selected by switch 35 remain invariant.

In accordance with known circuit theory, it can be shown that the above stated conditions are met if:

$$R_{42} = R_m \frac{x}{1-x} \quad (1)$$

$$R_{44} = R_m \frac{R_m}{R_{42} + R_m} \quad (2)$$

where $R_{42}$ and $R_{44}$ represent the respective resistance of corresponding elements 42 and 44; $R_m$ represents the internal resistance of output device 34, as already stated; and $x$ represents the resultant sensitivity of the system after insertion of $R_{42}$ and $R_{44}$, expressed as a fraction of the initial sensitivity.

Any desired number of corresponding pairs of resistances $R_{42}$ and $R_{44}$ may be provided, the specific representation in FIG. 1 being merely illustrative. Position 1 of switch 40 in FIG. 1 may be considered to insert a parallel resistance of infinite value and a series resistance of zero value, producing a fractional sensitivity change of unity in accordance with Equation 1.

FIG. 2 represents illustrative circuit connections for a modified system, which differs from the system of FIG. 1 in two primary respects. Firstly, the combined response of the system of FIG. 2 to the two photoresistive cells 31 and 32 corresponds to connection of those cells in parallel with each other, rather than in series as in the system of FIG. 1. Secondly, the sensitivity of the system of FIG. 2 is varied by a different type of switching device.

In FIG. 2 the photoresistive cells 31 and 32 and their associated light collecting devices, the output device 34, and the resistance 36, as well as battery 33, main switch 37 and designated circuit points correspond essentially to the similarly designated elements of FIG. 1 and are typically as already described.

The function-controlling switch 45 has in section A a movable contact 46 that engages two of the fixed contacts at once. Thus, in switch position 2, as shown, the line 47 is connected to both of the lines 48 and 49. The two photo-resistive cells 31 and 32 are thereby connected in parallel in the main circuit that includes in series battery 33 and output device 34. Switch 45 has a second section B. In switch position 2, as shown, that switch section connects the resistance 36 between circuit points 27 and 28, thereby shunting output device 34. When switch 45 is in position 1 or position 3, switch section A connects line 47 to only one of the lines 48 and 49, connecting the corresponding one of the photoresistative cells in series with the main circuit, and opening the line to the other cell. Switch section B then opens the connection of resistance 36.

Thus, when only one of the photoresistive cells is connected, the entire battery current flows through output device 34 (considering the resistance assembly 60 as a part of that device for the moment). The output device then responds with definite sensitivity to the light that is incident upon the selected cell. When switch 45 is shifted to position 2, the two cells are connected in parallel, reducing the resistance in the cell portion of the system from that of one cell to that of two cells in parallel. The resistance in the output portion of the circuit, between points 27 and 28, is also reduced by ½ by insertion of shunt resistance 36. Consequently more current flows from the battery. However, as described for the system of FIG. 1, the parallel circuits between 27 and 28 act as a current divider, so that only one half of the total current is available to the output device. Thus whenever the light intensities upon the two cells are such as to make the respective cell resistances equal, the output response is the same for all three positions of switch 45. If the cell resistances are different, the output response represents a medial value of the intensities of illumination on the respective cells.

Whereas the parallel connection of the two photoresistive cells, as in the system of FIG. 2, may be preferred over the series connection of FIG. 1 for purely electrical reasons, it has the further characteristic of producing a distinctively different functional response to the two light intensities incident upon the respective cells. For both parallel and series connection of the two photoresistive cells, the invention provides uniform output response when the resistances of the two cells are equal. But, when those resistances are different, the combined response for parallel connection corresponds more closely to the single-celled response of the cell receiving the more intense illumination, whereas the combined response for the series connection of FIG. 1 corresponds more closely to the single-cell response for the cell receiving less intense illumination. Stated from another viewpoint, with parallel connection of the cells the combined response corresponds approximately to the arithmetic mean of the resistance values of the two cells; while with series connection of the cells the combined response is closer to the geometrical mean of those resistance values.

In the system of FIG. 2 the resistances 42e and 44e correspond generally to any pair of corresponding resistances 42 and 44 of FIG. 1. Resistances 42e and 44e are mounted in a cartridge structure represented schematically at 62. That structure includes three mutually spaced and insulated contact surfaces 64, 65 and 66. Corresponding spring contacts 64a, 65a and 66a are connected in the circuit as shown, and are suitably mounted in position to engage the respective surfaces of a positioned cartridge. Means for positioning the cartridge are represented schematically as the spring 68. With cartridge 62 in position as shown, the spring contacts act as a multiple switch for inserting resistance 42e in shunt to output device 34 and for inserting resistance 44e in series in the main circuit. The sensitivity of response of the system is then determined by the value of $R_{42}$ in accordance with Equation 1 above. the value of $R_{44}$ is related to $R_{42}$ and the resistance of $R_m$ of the output device in accordance with Equation 2. If it is desired to change the system response to another value, cartridge 62 can be removed bodily and another cartridge inserted having resistances appropriately selected to give the desired sensitivity.

It will be understood, without detailed illustration, that a switchable cartridge system, such as that illustrated in FIG. 2, may be provided in a series-type circuit such as in shown in FIG. 1. Also, one or more of the pairs of resistances 42 and 44 of FIG. 1 may be constructed in the form of interchangeable cartridges. In the latter case, referring to the schematic structure of FIG. 2, spring contact 65a is typically connected to circuit point 21 of FIG. 1, and spring contacts 64a and 66a are connected to corresponding switch terminals in sections A and B, respectively, of switch 40. That arrangement has the advantage of providing not only for instant switching among a number of predetermined and entirely definite sensitivity values, but also permits one or more of those values to be changed at will by substitution of a different cartridge.

A typical practical instrument in accordance with the invention is the photographic exposure meter shown illustratively in FIGS. 3 to 7. That instrument utilizes the basic circuit arrangement of FIG. 1, modified in the manner just described. The instrument has a housing 70, preferably of molded plastic material, which contains an electrical indicator 80, typically of the D'Arsonval, moving coil type, with scale 81, corresponding generally to meter 34 and scale 39 of FIGS. 1 and 2. There is a replaceable battery 33, typically of 1.35 volts, which is held in place by a screw plug in the back of the housing. There is an ON-OFF switch 37; a first rotary switch 35, being of 2 circuit-3 position type. There is a second rotary switch 40, being of 2 circuit-5 position type. Located at the top of the housing 70 is a cell mount 71, preferably made of metal such as aluminum. The lower part of the cell mount forms a hollow shaft 74, which fits into a hole in the top of housing 70, and extends therethrough, where it is secured by means of a nut 75 on the threaded lower end of the shaft. This construction permits the cell mount to be rotatable with respect to housing 70 through a definite angle, preferably limited by stops, not explicitly shown. The purpose is to allow adjustable orientation of the light collectors and cells with respect to a photographic scene, while the scale of the electrical indicator 80 remains in a position most visible to the operator.

The cell mount has a longitudial tunnel 85 therethrough, which has internal threads extending inwardly for a short distance from each end. Fitted into the tunnel is a first photoresistive cell 31 and a second photoresistive cell 32. They face in opposite directions, each facing toward the respective nearest end of the tunnel. Associated with the cell 31, and spaced an appropriate distance therefrom, is a light collector for reflected light, typically comprising the lens 52. The lens 52 is held in place by a threaded ring 78, and a tubular spacer 76, which separates lens 52 and cell 31 by a distance approximately equal to the focal length of the lens. The inner end of spacer 76 is formed with a flange extending radially inward to establish a mask over the face of cell 31. The mask has a central aperture 79 which forms a suitable boundary for the scene image projected by the lens 52. An aperture-limiting diapragm 84 is preferably provided near lens 52, and may be formed as an integral part of ring 78. Variation or selection of the size of the diaphragm aperture varies the average illumination of photoresistive cell 31 and hence the effective resistance between its terminals for a given photographic scene and given lighting conditions. There is another spacer 77, which serves to separate cells 31 and 32. There is an incident light collector 53, comprising the translucent hemispherical shell 61, secured in a metal ring mount 82. Mount 82 includes a threaded sleeve which is screwed into the tunnel 85, where it serves also to hold cell 32 in place, thus completing the fixation of all elements inside the tunnel. By suitable selection of the length and internal diameter of mount 82, the response of photoresistive cell 32 to a given intensity of illumination of collector 53 may be accurately controlled.

It is ordinarily preferred to select and arrange the two photoresistive cells and their associated equipment in such a way that the respective resistances of the cells are essentially equal for a selected "normal" type of photographic scene under a selected "normal" mode of illumination, regardless of the intensity of that illumination. That may be accomplished to a good approximation by utilizing matched cells at 31 and 32 and by suitably determining the relative light intensities reaching the cells under the selected conditions, as by suitably selecting the size of aperture 84 at lens 52 and the dimensions of mount 82 at cell 32. Detailed adjustment of the balance between the two cells may be obtained by insertion of suitable neutral filters or additional masks in the optical system to vary the effective cell illumination, and by insertion of resistances or the like in the electrical system to vary the effective cell resistances.

Electrical lead wires from the cells pass through the axial bore 83 in cell mount shaft 74 and into the interior of housing 70. The electrical wiring system used to connect the various elements aforedescribed may typically correspond to the electrical circuit shown in FIG. 1 already described.

A unique means is provided for greatly extending the flexibility with which the overall sensitivity of the device can be varied. As previously described, each step in the sensitivity range is established by a pair of matched resistors, such as shown in FIG. 1 at 42 and 44. The circuit shown provides for five steps of sensitivity. In addition, the present instrument provides for selective changes in each of the five steps by means of small, separate, removable cartridges; each of which contains a pair of matched resistors and 3 electrodes, as shown schematically in FIG. 2. FIGS. 5 and 6 show a cartridge and the various elements therein on an enlarged scale; and FIG. 7 illustrates its mounting in the instrument. Each cartridge 90 contains a first fixed resistor 42 and a second fixed resistor 44. There is an electrode 91, to which both resistors are electrically connected. This electrode forms a cap at one end of the cartridge. That cap is threaded and screws into a ring mount 92, embedded in the instrument housing 70 flush with its front face. There is a second electrode 93, which forms a cap at the other end of the cartridge. One lead from resistor 42 is connected to electrode 93. There is a third electrode 94, in the form of a ring, centrally located on the periphery of the cartridge, to which one lead from resistor 44 is connected. The body 95 of the cartridge 90 is formed of a plastic of the epoxy type, which may be molded, and which serves to hold the elements of the cartridge together, while also serving as an electrical insulator.

There is an identifying mark on the upper end of the cartridge, as shown at 96 in FIG. 5. This serves to indicate the instrument sensitivity which will be established by that particular cartridge. That designation may be expressed directly in terms of film sensitivity, or camera shutter time, or both. Illustrated are markings in terms of film sensitivity, such as ASA Film Index numbers. A cartridge unit may be constructed, if desired, to provide the maximum available sensitivity of the system. Such a cartridge is typically outwardly similar to the other cartridges, except for the designation 96, but has infinite value of $R_{42}$ (open circuit between electrodes 91 and 93) and zero value of $R_{44}$ (direct connection between electrodes 91 and 94).

FIG. 7 shows a cartridge mounting ring 92 embedded in the housing 70, and having a threaded hole 100 therethrough. Into the threaded hole 100 is screwed the cartridge electrode 91, the body of the cartridge extending into a housing cavity 106 provided therefor. Ring 92 thus acts as an electrical connector to the cartridge cap. There is a spring contact 101, secured to the housing by screw 102 in position to form electrical contact with the cartridge electrode 94. There is another spring contact 103, secured to the housing by means of screw 104 in position to form electrical contact with cartridge electrode 93. Suitable electrical leads are shown from each of the contact elements 92, 101 and 103.

The device shown in FIGS. 3 and 4 typically contains five interchangeable cartridges at one time. The cartridge sockets 92 and the additional contact elements 101 and 103 for each cartridge are shown somewhat schematically in FIG. 4 with their electrical connections. Each cartridge may be removed or replaced with the help of a small spanner wrench which fits into the holes 105 in cap 91. The rotary switch 40, may be turned so as to place the pair of resistors in any one cartridge into active connection in the circuit. Other cartridges, suitable for other sensitivity values, may be substituted in place of any of the cartridges shown, thus making the instrument suitable for the group of sensitivity values most used by the individual photographer.

A feature of the device is that the sockets 92 for the cartridges are so located around the periphery of the rotary switch 40; and the electrical leads from each socket are so connected to appropriate switch contacts, respectively; and the identifying notation 96 on each cartridge is so located; that the index mark on the switch control knob 50 cooperates directly with the notation on each cartridge, when the cartridge is in place in a socket, to indicate the sensitivity to which the device has been adjusted, in terms appropriate for the use at hand.

It will be understood that although I have shown an instrument which includes a rotary switch 40, and five cartridges; it would be within the scope of the invention to exclude the switch 40, and simply change the sensitivity of the instrument by the use of one cartridge at a time only, screwed into one recess such as that shown in FIG. 7.

Another variation would be to include the rotary switch 40, with any desired number of pairs of fixed resistors permanently mounted in the case, instead of using the interchangeable cartridges.

Although the use of the circuit shown in FIG. 1 has been illustrated by description of an exposure meter, the circuit is equally adaptable to use in an exposure control means such as that on a camera where the electrically responsive device 34 operates a diaphragm, for example, in a camera lens system. Also, a practical instrument may utilize the parallel connection of the two photoresistive cells, as in FIG. 2, rather than the series connection illustrated in the present instrument.

Many other changes and modifications of the illustrative embodiments herein described may be made by those skilled in the art without departing from the proper scope of the invention, which is defined in the appended claims.

I claim:
1. In a photometric system responsive to illumination of a photographic scene, the combination of:
first and second photoresistive means, each of said means having an electrical resistance that decreases with increasing intensity of light incident thereon,
means for illuminating one of the photoresistive means with light of intensity substantally correspondng to the intensity of light incident upon a scene,
means for simultaneously illuminating the other photoresistive means with light of intensity substantially corresponding to the average intensity of light reflected by said scene,
electric power means,
electrically actuable means for producing mechanical response to electrical current flowing therein and having electrical resistance to predetermined value,
impedance means having electrical resistance substantially equal to said value,
circuit means forming a main circuit that includes in series the power means and the electrically actuated means, said circuit means including first switch means actuable selectively to three positions to insert in said main circuit said one photoresistive means, said other photoresistive means, and both of said photoresistive means, respectively, and second switch means actuated with the first switch means for selectively connecting said impedance means in shunt to a portion of said main circuit that includes the electrically actuated means to make the response of said electrically actuated means uniform in all three positions of the first switch means whenever the respective resistances of the two photoresistive means are equal.

2. The combination defined in claim 1, and including also first resistance means, second resistance means having a resistance value substantially equal to the square of said predetermined value divided by the sum of said predetermined value and the resistance value of said first resistance means, and third switch means selectively actuable independently of the position of the first and second switch means to insert said first resistance means in shunt to the electrically actuated means and to insert simultaneously said second resistance means in series with the electrically actuated means within said portion of the main circuit, whereby said actuation of the third switch means modifies the response of said electrically actuated means by a fraction that is uniform in all three positions of the first switch means.

3. The combination defined in claim 1, and including also structure forming a plurality of cartridge units each comprising first and second associated resistance means mounted in mutually fixed and insulated relationship, electrically conductive electrode elements fixedly mounted on the cartridge unit in mutually spaced and insulated relation, and means electrically connecting the first and second resistance means between respective pairs of said electrode elements, the first resistance means of the respective cartridges having different resistance values, and the second resistance means of each cartridge unit having a resistance value substantially equal to the square of said predetermined value divided by the sum of said predetermined value and the resistance value of the associated first resistance means, housing means for mounting at least said electrically actuable means and including structure forming a socket adapted to releasably receive a cartridge unit in predetermined position therein, electrically conductive contact structures mounted on the housing means in respective positions to contact the respective electrode elements of a positioned cartridge unit, said contact structures being electrically connected with said circuit means, said electrode elements and contact structures forming switch means acting in response to positioning of a cartridge unit in the socket to insert the first resistance means of the positioned cartridge unit in shunt to the electrically actuated means and to insert the second resistance means of the positioned cartridge unit in series with the electrically actuated means within said portion of the main circuit, whereby substitution of one of said cartridge units for another in the socket modifies the response of said electrically actuated means by a fraction that is uniform in all three positions of the first switch means.

4. The combination defined in claim 1, and including also a plurality of first resistance means having different resistance values, an equal plurality of second resistance means corresponding to the respective first resistance means, each of the second resistance means having a resistance value substantially equal to the square of said predetermined value divided by the sum of said predetermined value and the resistance value of the corresponding first resistance means, and third switch means selectively actuable independently of the position of the first and second switch means to insert a selected one of said first resistance means in shunt to the electrically actuated means and to insert simultaneously the corresponding second resistance means in series with the electrically actuated means within said portion of the main circuit.

5. The combination defined in claim 4, and including also structure forming a plurality of cartridge units each containing one of said first resistance means and the corresponding second resistance means in mutually fixed and insulated relationship, housing means for mounting at least said third switch means and including means for releasably mounting a plurality of cartridges in predetermined positions, and means for electrically connecting the resistance means of a mounted cartridge to said third switch means for selective switching action thereby.

6. The combination defined in claim 5, and including also visual means carried by each cartridge unit and corresponding to the resistance value of said first resistance means in said unit, the cartridge units being mountable on the housing means with said visual means visible and in ordered arrangement with respect to the third switch means, and indicating means movable with actuation of the third switch means for designating the visual means of the inserted cartridge unit that is acted on in each switch position.

7. In a photometric system responsive to illumination of a photographic scene, the combination of:

first and second photoresistive means, each of said means having an electrical resistance that decreases with increasing intensity of light incident thereon, means for illuminating one of the photoresistive means with light of intensity substantially corresponding to the intensity of light incident upon a scene, means for simultaneously illuminating the other photoresistive means with light of intensity substantially corresponding to the average intensity of light reflected by said scene, electric power means, electrically actuable means for producing mechanical response to electrical current flowing therein and having electrical resistance of predetermined value, impedance means having electrical resistance substantially equal to said value, circuit means including first switch means actuable selectively to three positions to form corresponding electrical circuits that include, respectively, said one photoresistive means, said other photoresistive means, and both of said photoresistive means connected in series, each of said circuits including in series the power means and the electrically actuable means, and second switch means actuated with the first switch means for selectively connecting said impedance means in shunt to the electrically actuable means only in said first and second positions of the first switch means.

8. In a photometric system responsive to illumination of a photographic scene, the combination of:

first and second photoresistive means, each of said means having an electrical resistance that decreases with increasing intensity of light incident thereon, means for illuminating one of the photoresistive means with light of intensity substantially corresponding to the intensity of light incident upon a scene, means for simultaneously illuminating the other photoresistive means with light of intensity substantially corresponding to the average intensity of light reflected by said scene, electric power means, electrically actuable means for producing mechanical response to electrical current flowing therein and having electrical resistance of predetermined value, impedance means having electrical resistance substantially equal to said value, circuit means including first switch means actuable selectively to three positions to form corresponding electrical circuits that include, respectively, said one photoresistive means, said other photoresistive means, and both of said photoresistive means connected in parallel, each of said circuits including in series the power means and the electrically actuated means, and second switch means actuated with the first switch means for selectively connecting said impedance means in shunt to the electrically actuated means only in said third position of the first switch means.

9. In a photometric system, the combination comprising photoelectric means responsive to illumination of a photographic scene, output means responsive to electrical current and having electrical resistance of predetermined value, structure forming a plurality of cartridge units each comprising first and second associated resistance means mounted in mutually fixed and insulated relationship, electrically conductive electrode elements fixedly mounted on the cartridge unit in mutually spaced and insulated relation, and means electrically connecting the first and second resistance means between respective pairs of said electrode elements, the first resistance means of the respective cartridges having different resistance values, and the second resistance means of each cartridge unit having a resistance value substantially equal to the square of said predetermined value divided by the sum of said predetermined value and the resistance value of the associated first resistance means, housing means for mounting at least said output means and including structure forming a socket adapted to releasably receive a cartridge unit in predetermined position therein, electrically conductive contact structures mounted on the housing means in respective positions to contact the respective electrode elements of a positioned cartridge unit, circuit means interconnecting the photoelectric means, the output means and the contact structures, said electrode elements and contact structures forming switch means acting in response to positioning of a cartridge unit in the socket to form with said circuit means an electric circuit for producing in the output means an electric current representing said illumination, said circuit including the photoelectric means and the output means connected in series, and including the first resistance means of the positioned cartridge unit connected in shunt to the output means and including the second resistance means of the positioned cartridge unit connected in series with the output means, whereby substitution of one of said cartridge units for another in the socket modifies the current through the output means by a fraction that is independent of said illumination.

10. The combination defined in claim 9, and wherein said cartridge unit is generally cylindrical and the electrode elements have axially symmetrical conductive surfaces axially spaced on the cartridge, one of said electrode elements being coaxially threaded, and one of said contact structures comprises a conductive ring internally threaded to receive the threads of said one electrode element for retaining the cartridge unit in the socket and for making electrical contact between said one electrode element and the ring.

11. In a photometric system, the combination comprising photoelectric means responsive to illumination of a photographic scene, output means responsive to electrical current and having electrical resistance of predetermined value, structure forming a plurality of cartridge units each comprising first and second associated resistance means mounted in mutually fixed and insulated relationship, electrically conductive electrode elements fixedly mounted on the cartridge unit in mutually spaced and insulated relation, and means electrically connecting the first and second resistance means between respective pairs of said electrode elements, the first resistance means of the respective cartridges having different resistance values, and the second resistance means of each cartridge unit having a resistance value substantially equal to the square of said predetermined value divided by the sum of said predetermined value and the resistance value of the associated first resistance means, housing means for mounting at least said output means and including structure forming a plurality of sockets each adapted to receive a cartridge unit in predetermined position therein, electrically conductive contact structures mounted on the housing means in association with each said socket in respective positions to contact the respective electrode elements of a positioned cartridge unit, circuit means interconnecting the photoelectric means and the output means, switch means having a plurality of positions corresponding to the respective sockets and actuable to connect contact structures associated with a selected socket to said circuit means to form therewith an electric circuit for producing in the output means an electric current representing said illumination, said circuit including the photoelectric means and the output means connected in series, and including the first resistance means of a cartridge unit positioned in the selected socket connected in shunt to the output means, and including the second resistance means of that positioned cartridge unit connected in series with the output means, whereby substitution of one of said cartridge units for another in the selected socket, or switch actuation to select another socket containing another cartridge unit, modifies the current through the output means by a fraction that is independent of said illumination.

12. The combination defined in claim 11, and including also visual means carried by each cartridge unit and corresponding to the resistance value of said first resistance means in said unit, the cartridge units being mountable in said sockets with said visual means visible and in ordered arrangement with respect to said switch means, and indicating means movable with actuation of the switch means for designating the visual means of a cartridge unit that is mounted in the socket that corresponds to the position of the switch means.

References Cited by the Examiner
UNITED STATES PATENTS 2,918,606 12/1959 Peras _____ 250—209 X
3,049,050 8/1962 Thomas _____ 88—23
3,091,166 5/1963 Norwood _____ 95—64

RALPH G. NILSON, *Primary Examiner.*

WALTER STOLWEIN, *Examiner.*